United States Patent
Koizumi

[11] 3,888,397
[45] June 10, 1975

[54] BICYCLE BAG

[76] Inventor: Edward S. Koizumi, 2446 N. Geneva Ter., Chicago, Ill. 60614

[22] Filed: July 26, 1973

[21] Appl. No.: 382,965

[52] U.S. Cl. .................... 224/35; 224/30 A; 224/36
[51] Int. Cl. .............................................. B62j 7/06
[58] Field of Search ..... 224/34, 35, 36, 32 R, 30 A, 224/8 R

[56] References Cited
UNITED STATES PATENTS
| | | | |
|---|---|---|---|
| 470,878 | 3/1892 | Mease | 224/36 |
| 475,174 | 5/1892 | Barbour | 224/36 UX |

FOREIGN PATENTS OR APPLICATIONS
| | | | |
|---|---|---|---|
| 244,975 | 10/1946 | Switzerland | 224/36 |
| 877,460 | 9/1961 | United Kingdom | 224/32 R |
| 496,306 | 11/1938 | United Kingdom | 224/8 R |

Primary Examiner—Robert J. Spar
Assistant Examiner—Jerold M. Forsberg
Attorney, Agent, or Firm—Wolfe, Hubbard, Leydig, Voit & Osann, Ltd.

[57] ABSTRACT

A bicycle carrying bag that is detachably mountable on the rider's side of the handlebars without hindering operation of the bicycle. The bag has a pair of main internal compartments and a pair of side pocket compartments, each of which are readily accessible to the rider while on the bicycle.

4 Claims, 4 Drawing Figures

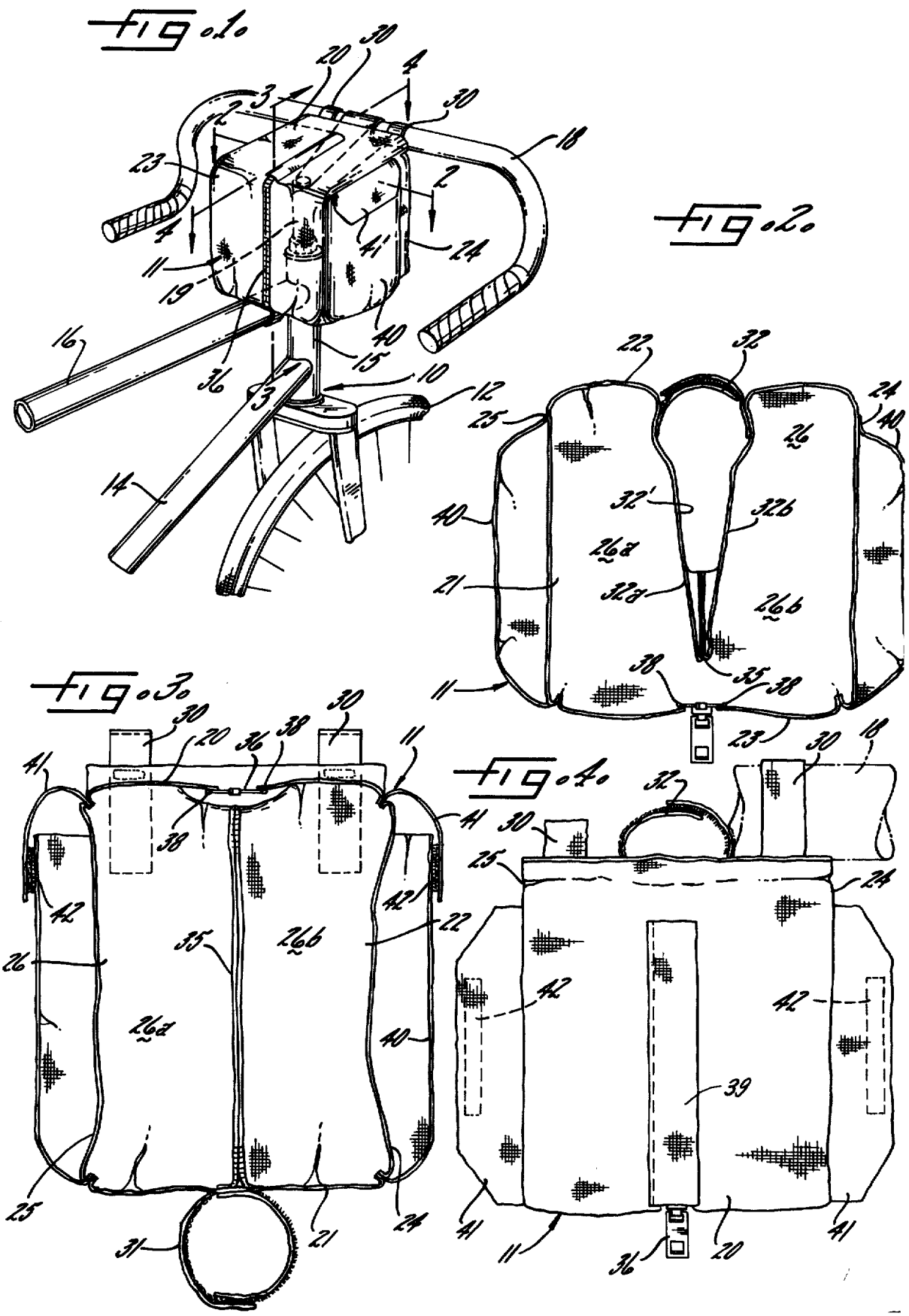

BICYCLE BAG

DESCRIPTION OF THE INVENTION

The present invention relates generally to carrying bags for bicycles, and more particularly, to a bag that is detachably mountable on the handlebars of a bicycle.

In the course of lengthy bicycle trips, it is frequently necessary for the rider to have with him a small quantity of food, such as a sandwich, certain small tools that may be needed for repairs, as well as other items the rider may wish to take with him. It often is desirable to keep certain of these items separated as they are being transported, such as keeping the food apart from unsanitary items, but yet have them easily accessible to the rider while he is on the bicycle. Prior bags and baskets for bicycles have not been well suited for this purpose.

Accordingly, it is an object of the invention to provide a bicycle carrying bag that is adapted to separately contain in closed compartments items during transport, but which permits ready access to the compartments by a rider while on the bicycle.

Another object is to provide a bicycle carrying bag as characterized above that is adapted for mounting on the rider's side of the handlebars without hindering the rider's operation of the bicycle.

Other objects and advantages of the invention will become apparent from the attached detailed description and upon reference to the drawings, in which:

FIG. 1 is a fragmentary perspective of a bicycle having a carrying bag embodying the present invention mounted on the handlebars;

FIG. 2 is an enlarged cross-sectional top view of the bag shown in FIG. 1 taken along the horizontal plane of line 2—2;

FIGS. 3, 4 are enlarged sections of the bag shown in FIG. 1 taken in the planes of lines 3—3 and 4—4, respectively.

While the invention is susceptible of various modifications and alternative constructions, a certain illustrative embodiment has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring more particularly to FIG. 1 of the drawings, there is shown a bicycle 10 having a carrying bag 11 embodying the present invention. The bicycle 10 is of a conventional type including a front wheel 12 and a support frame 14 having an upright post 15 and a horizontal bar 16. Handlebars 18 are supported upwardly and slightly forwardly of the upright post 15 by a forwardly angled stem 19 secured to the post.

In accordance with the invention, the bag 11 is a compartmentized unit that is detachably mounted on the handlebars on the rider's side thereof for easy access to the compartments while the rider is on the bicycle. To this end, the bag 11, which preferably may be made of a canvas or nylon material, comprises top and bottom panels 20, 21, front and rear panels 22, 23 and a pair of side panels 24, 25 which together define an interior storage area 26. To releasably secure the bag 11 to the bicycle 10, two pairs of nylon fastening strips 30, commonly known in the trade as "Velcro" fasteners, are provided at the junction at the top panel 20 and front panel 22. Such fastening strips typically each have a bristle-like surface on one side thereof which surfaces may be selectively brought into interlocking engagement with each other and which may be readily separated by manually pulling the strips apart. The stirps 30 in this case each are secured at one end to the bag 11 and their other ends are wrapped about the handlebars 18 so as to engage each other and hold the bag in place. To secure the bottom of the bag to the bicycle, a third pair of such fastening strips 31 are provided at the juncture of the rear and bottom panels 23, 21 for engaging the horizontal support bar 16 and a fourth pair of strips 32 are provided at the front of the bottom panel 21 for securing the bag to the upright post 15.

In keeping with the invention, the front panel 22 of the bag is formed with a central recessed section 32 that is adapted to receive the angled handlebar support stem 19 and to form a partition which separates the interior storage area 26 of the bag into two internal compartments 26a, 26b on opposite sides of the stem 19. For this purpose, the bottom panel 21 of the illustrated bag is formed with a central front opening V-notch which is adapted to receive the angled stem 19. The recessed section 32 of the front panel 22 comprises a pair of walls 32a, 32b extending upwardly from the sides of the bottom panel V-notch to an elevation slightly below the top panel 20 so as to separate the interior of the bag into the two distinct compartments 26a, 26b. The walls 32a, 32b of the recessed section 32 are joined along a vertical line 35 extending upwardly from the apex of the bottom panel V-notch and along their upper horizontal edges so as to in effect form a pocket that receives the angled stem 19.

In order to permit ready access to the bag storage compartments 26a, 26b, a zipper 36 runs centrally from the forward end of the top panel 20 to the bottom of the rear panel 23. Since the bag is on the rider's side of the bicycle, it will be seen that the zipper 36 is readily accessible to the rider while on the bicycle. To facilitate opening and closing of the zipper 36 and to provide means for maintaining a generally rectangular form of the bag, stiffening means in the form of a pair of L-shaped wires 38 are sewn into the bag on opposite sides of the zipper 36. A flap 39 also is secured on one side of the zipper 36 on the top panel 20 for covering the top panel portion of the zipper.

In order to provide still additional compartments for the bag 11, a side pocket 40 is provided on each of the side panels 24, 25. Each side pocket 40 in this case has an upper opening which is selectively closable by a flap 41. To releasably secure the flap in its pocket closing position, a nylon fastening strips 42, such as the Velcro fastener strips described above, are provided on the flap 41 and on the upper portion of the side pocket 40 for selective engagement with each other when the flap is closed. It will be seen that such side pocket closure means enables the rider while on the bicycle to easily open and close the side pockets without the need for cumbersome snaps, straps, buttons or like fasteners.

From the foregoing, it can be seen that the carrying bag of the present invention may be readily mounted on the rider's side of the handlebars without hindering the rider's operation of the bicycle. Moreover, it is adapted to contain items in separate enclosed compartments during transport, while permitting the rider ready access to the compartments while on the bicycle.

What is claimed is:

1. A carrying bag for a bicycle having a frame with a forwardly angled stem supporting a handlebar, said bag comprising front, rear, top, and bottom pnales with a pair of interconnecting side panels, said panels defining an interior storage area, said bottom panel being formed with a central front opening V-notch, and said front panel being formed with a recessed section comprising a pair of walls extending upwardly from the sides of the bottom panel V-notch to an elevation slightly below the top panel so as to define a central internal partition separting the interior storage area of the bag into two distinct compartments, said recessed central portion of the front panel of the bag and said central opening V-notch in the bottom panel of the bag thus forming a pocket to receive the angled handlebar support stem of the bicycle said bag being attached to and retaining said stem in said V-notch by a releasable, means on said front panel for releasably securing said bag to said handlebars on the rider's side of said handlebars with said front panel adjacent said handlebar, means on said bottom panel for securing said bag to a bar of the bicycle frame, and means in said top and rear panels for permitting selective access to the interior compartments of said bag.

2. The bicycle bag of claim 1 in which said bag access means is a zipper means that runs along the center of said top and rear panels positioned over and in front of a central internal partition, said zipper means when opened permitting access to both of said internal compartments.

3. The bicycle bag of claim 2 in which an angle shaped stiffening means is mounted within said top and rear panels on opposite sides of said zipper.

4. The bicycle bag of claim 3 in which said stiffening means is a pair of wires.

* * * * *